(12) United States Patent
Lee (10) Patent No.: US 7,826,173 B2
(45) Date of Patent: Nov. 2, 2010

(54) DISK SPACER AND HARD DISK DRIVE HAVING THE SAME

(75) Inventor: Chul-woo Lee, Seongnam-si (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 634 days.

(21) Appl. No.: 11/782,095

(22) Filed: Jul. 24, 2007

(65) Prior Publication Data

US 2008/0019037 A1    Jan. 24, 2008

(30) Foreign Application Priority Data

Jul. 24, 2006    (KR) .................... 10-2006-0069271

(51) Int. Cl.
*G11B 19/20* (2006.01)
(52) U.S. Cl. .................................. 360/98.08
(58) Field of Classification Search .............. None
See application file for complete search history.

(56) References Cited

U.S. PATENT DOCUMENTS

| | | | | | |
|---|---|---|---|---|---|
| 5,295,030 | A | * | 3/1994 | Tafreshi | 360/99.12 |
| 5,333,080 | A | * | 7/1994 | Ridinger et al. | 360/99.12 |
| 5,392,178 | A | * | 2/1995 | Nishio et al. | 360/99.08 |
| 5,422,770 | A | * | 6/1995 | Alt | 360/244.2 |
| 5,452,157 | A | * | 9/1995 | Chow et al. | 360/98.08 |
| 5,517,376 | A | * | 5/1996 | Green | 360/98.08 |
| 5,528,434 | A | * | 6/1996 | Bronshvatch et al. | 360/98.08 |
| 5,615,067 | A | * | 3/1997 | Jabbari et al. | 360/98.08 |
| 5,880,905 | A | * | 3/1999 | Kazmierczak et al. | 360/98.08 |
| 7,181,824 | B1 | * | 2/2007 | Suwito et al. | 29/603.03 |
| 7,529,064 | B1 | * | 5/2009 | Huang et al. | 360/99.08 |

FOREIGN PATENT DOCUMENTS

| | | |
|---|---|---|
| JP | 6-96514 | 4/1994 |
| JP | 8-147937 | 6/1996 |
| JP | 2001-291301 | 10/2001 |

* cited by examiner

*Primary Examiner*—Mark Blouin
(74) *Attorney, Agent, or Firm*—Stanzione & Kim LLP (57) ABSTRACT

A disk spacer located on a rotator of a spindle motor to allow an additional disk to be mounted on the spindle motor, the disk spacer including a screw hole formed in a central part of the disk spacer to allow a clamping screw to pass through, a first disk pressing part located in a lower surface of an outer circumference part of the disk spacer to press surroundings of a central hole of a first disk directly mounted on the rotator, and a second disk supporter located on an upper surface of the outer circumference part of the disk spacer to support surroundings of a central hole of a second disk located above the first disk, and a hard disk drive having the disk spacer.

23 Claims, 5 Drawing Sheets

DISK SPACER AND HARD DISK DRIVE HAVING THE SAME

CROSS-REFERENCE TO RELATED APPLICATIONS

This application claims priority under 35 U.S.C. §119(a) from Korean Patent Application No. 10-2006-0069271, filed on Jul. 24, 2006, in the Korean Intellectual Property Office, the disclosure of which is incorporated herein in its entirety by reference.

BACKGROUND OF THE INVENTION

1. Field of the Invention

The present general inventive concept relates to a disk spacer of a hard disk drive (HDD), and more particularly, to a disk spacer located between a pair of adjacent disks to maintain a constant gap between the disks, when a plurality of disks are mounted on a spindle motor, and an HDD having the disk spacer.

2. Description of the Related Art

An HDD is a supplementary memory device used in personal computers (PCs), MP3 players, mobile phones, etc. which uses a magnetic head to read data from and write data on a disk. The disk is mounted on and rotated by a spindle motor, and the magnetic head floats over the rotating disk.

HDDs using 3.5 inch or 2.5 inch-diameter disks can be given various storage capacities by installing either one or two disks on the same spindle motor. Thus, an HDD having only one disk has the same height as an HDD having two disks. However, small HDDs using disks of 1.8-inch diameter or less use different spindle motors to install different numbers of disks.

Figure 1:
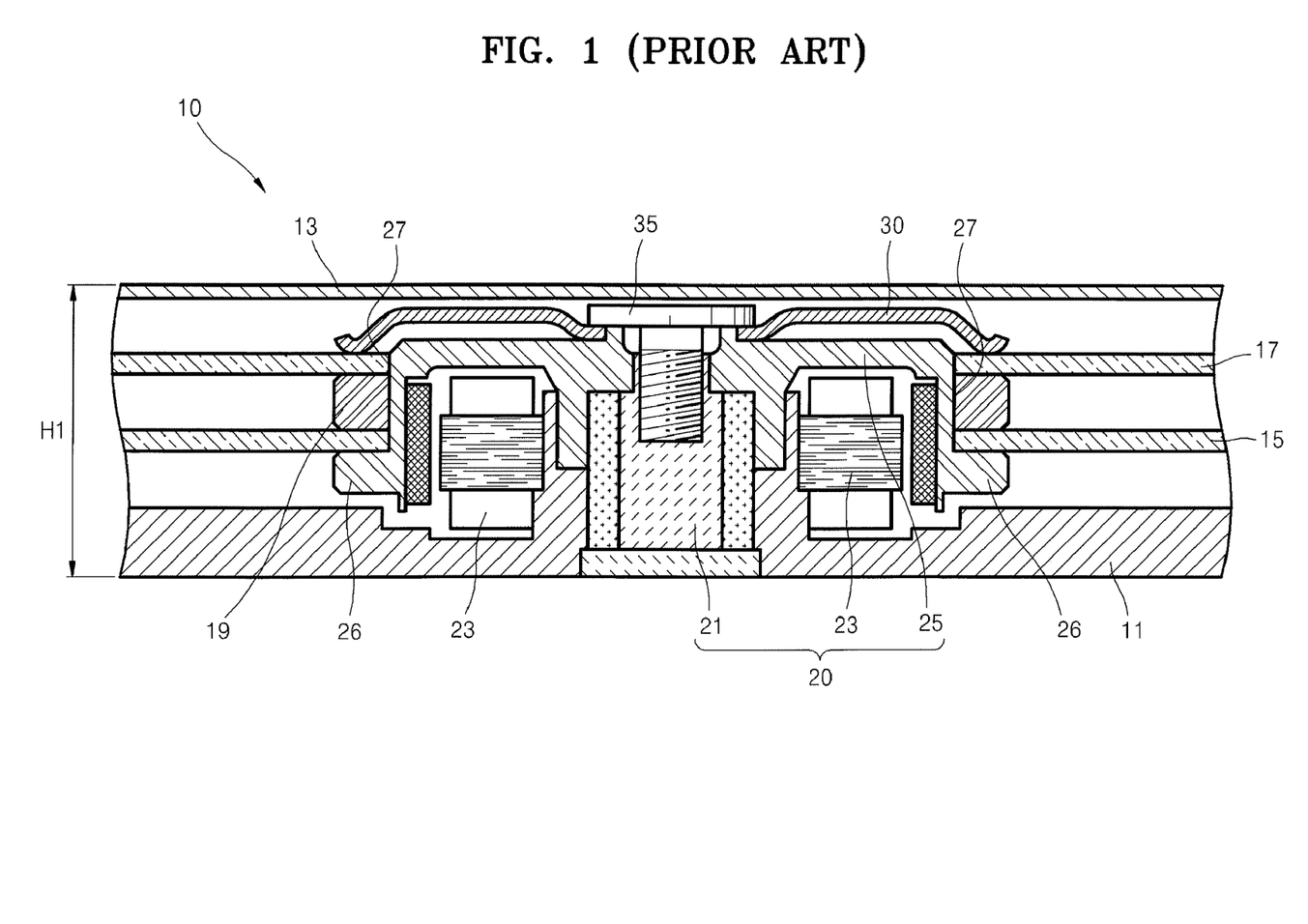
Figure 2:
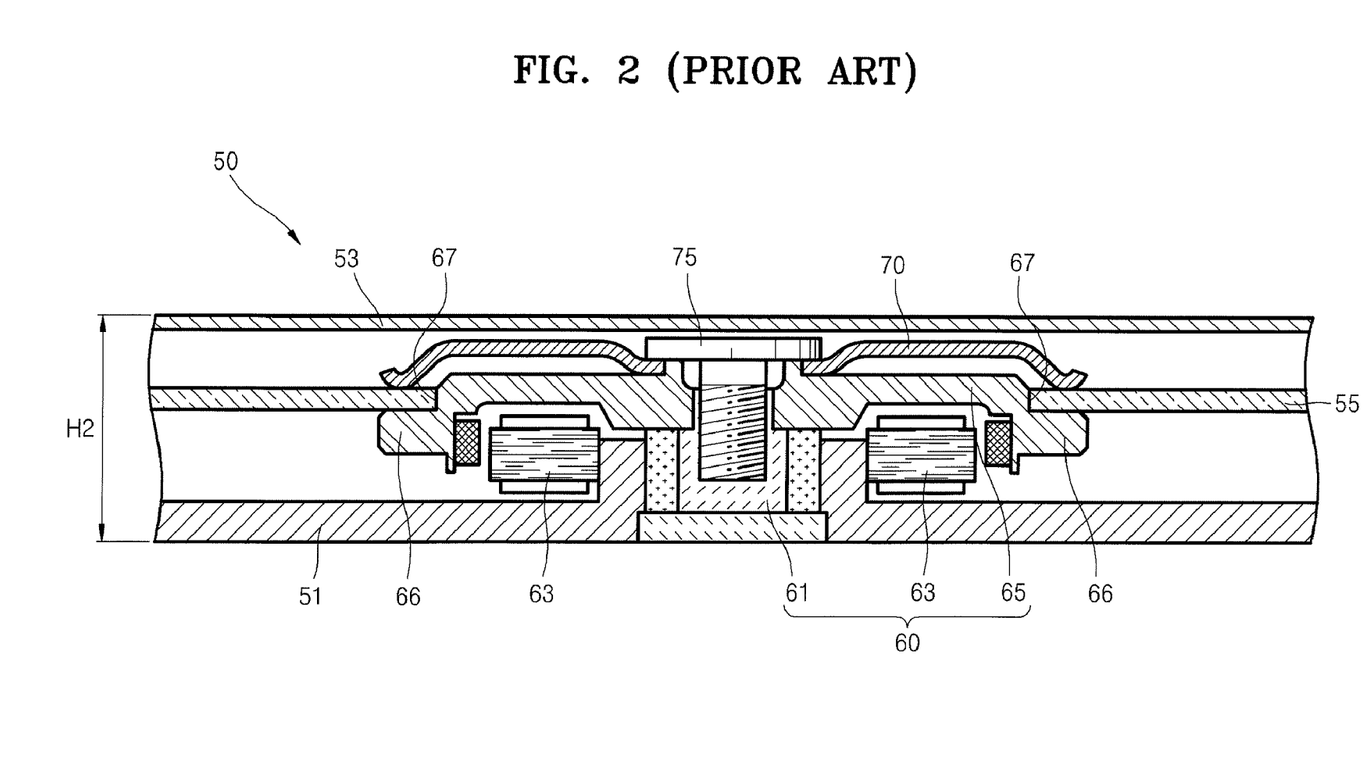

FIGS. 1 and 2 are cross-sectional diagrams illustrating conventional HDDs having 1.8-inch diameter disks. FIG. 1 illustrates an HDD 10 having two disks, and FIG. 2 illustrates an HDD 50 having only one disk.

Referring to FIG. 1, the HDD 10 includes a base member 11, a cover member 13 assembled with the base member 11, a spindle motor 20 mounted on the base member 11, and first and second disks 15 and 17 mounted on the spindle motor 20. The spindle motor 20 includes a shaft 21, on which are mounted a stator 23 and a rotator 25. The rotator 25 may also be called a hub. The rotator 25 includes a cylindrical circumference part 27 and a flange 26 projecting outwards from below the cylindrical circumference part 27.

The first and second disks 15 and 17 are put onto the cylindrical circumference part 27, and the first disk 15 is supported by the flange 26. A ring-shaped spacer 19 is located between the first and second disks 15 and 17 to separate them. The pair of disks 15 and 17 are fixed to the rotator 25 by a disk clamp 30 pressed by a clamping screw 35 screwed into the shaft 21.

Referring to FIG. 2, the HDD 50 includes a base member 51, a cover member 53 assembled with the base member 51, a spindle motor 60 mounted on the base member 51, and a disk 55 mounted on the spindle motor 60. The spindle motor 60 includes a shaft 61, on which are mounted a stator 63 and a rotator 65. The rotator 65 may also be called a hub. The rotator 65 includes a cylindrical circumference part 67 and a flange 66 projecting outwards from below the cylindrical circumference part 67.

The disk 55 is put onto the cylindrical circumference part 67 and supported by the flange 66. The disk 55 is fixed to the rotator 65 by a disk clamp 70 pressed by a clamping screw 75 screwed into the shaft 61.

The cylindrical circumference part 67 of FIG. 2 is shorter than the cylindrical circumference part 27 of FIG. 1, allowing a height H2 of the HDD 50 using only one disk to be less than a height H1 of the HDD 10 using two disks. However, since two types of spindle motors (20 of FIG. 1 and 60 of FIG. 2) must be manufactured for disks of the same diameter, manufacturing costs are increased by a lack of common parts.

SUMMARY OF THE INVENTION

The present general inventive concept provides a disk spacer allowing an additional disk to be mounted on a spindle motor as well as a designed number of disks, and a hard disk drive (HDD) having the disk spacer.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a disk spacer located on a rotator of a spindle motor to allow an additional disk to be mounted on the spindle motor, the disk spacer including a screw hole formed in a central part of the disk spacer to allow a clamping screw to pass through, a first disk pressing part located at a lower surface of an outer circumference part of the disk spacer to press surroundings of a central hole of a first disk directly mounted on the rotator, and a second disk supporter located at an upper surface of the outer circumference part of the disk spacer to support the surroundings of a central hole of a second disk located above the first disk, and an HDD having the disk spacer.

The disk spacer may further include a step portion to match an outer circumference edge of the rotator of the spindle motor disposed at an inner position of the first disk pressing part.

The disk spacer may further include a first ring-shaped protrusion to fit into the screw hole formed in a central part of a disk clamp disposed at an upper surface of the central part of the disk spacer.

The disk spacer may further include a second ring-shaped protrusion to fit into a central hole of the second disk disposed at an inner position of the second disk supporter.

The disk spacer may further include a central groove which can accommodate a ring-shaped protrusion formed in a central part of the rotator of the spindle motor disposed at a lower surface of the central part of the disk spacer.

An internal screw thread may be formed in an inner surface of the screw hole of the disk spacer to match an external screw thread of the clamping screw.

A material of the disk spacer may be one of titanium, stainless steel, and engineering plastics.

The foregoing and/or other aspects and utilities of the present general inventive concept are also achieved by providing a hard disk drive (HDD), including a shaft, a spindle motor having a rotator to rotate with the shaft, a first disk mounted at an upper and outer portion of the rotator, a disk spacer disposed along a circumferential length of the rotator and above the first disk, a second disk mounted at an upper and outer portion of the disk spacer, and a clamp member to clamp the second disk to the disk spacer such that the disk spacer presses and contains the first disk at the outer portion of the rotator.

The disk spacer may include a first disk pressing part disposed at a lower surface of the outer portion of the disk spacer to press surroundings of a central hole of the first disk mounted on the rotator, and a second disk supporter located at the upper and outer portion of the disk spacer to support surroundings of a central hole of the second disk.

A height of the upper and outer portion of the rotator where the first disk is mounted may be slightly higher that a thickness of the first disk, and the disk spacer may further include a step portion to match the upper and outer portion of the rotator where the first disk is mounted at an inner portion of first pressing part.

The disk spacer may include a first ring-shaped protrusion to fit into a screw hole of the clamp member and to help align the disk clamp with a rotational axis of the spindle motor.

The foregoing and/or other aspects and utilities of the present general inventive concept are also achieved by providing a spindle motor assembly usable in a hard disk drive, the spindle motor assembly including a shaft, a rotator rotatably mounted on the shaft to rotate and to support a first disk, a stator disposed on the shaft, and a disk spacer disposed on the rotator to support a second disk and to rotate with the rotator, wherein the rotator accommodates only the first disk and the disk spacer allows the second disk to be installed on the rotator.

The disk spacer may include a main body, a first pressing part disposed at a lower surface of an outer circumference of the main body to press a central portion of the first disk to the rotator, a second pressing part disposed at an upper surface of the outer circumference of the main body to support a central portion of the second disk, and a receiver to receive a screw of a clamping part to press the second disk to the disk spacer and the first disk to the rotator.

The first disk may be mounted on an outer circumferential receiving part of the rotator and a height of the outer circumferential receiving part may be slightly higher that a thickness of the first disk, and the disk spacer may further include a step portion to match the outer circumferential receiving part at an inner portion of first pressing part.

The foregoing and/or other aspects and utilities of the present general inventive concept are also achieved by providing a disk spacer usable with a single disk spindle assembly, the disk spacer including a main body, a first pressing part disposed at a lower surface of an outer circumference of the main body to press a central portion of a first disk to a rotator of the spindle assembly, a second pressing part disposed at an upper surface of the outer circumference of the main body to support a central portion of an additional disk, and a receiver to receive a screw of a clamping part to press the additional disk to the disk spacer and the first disk to the rotator.

The disk spacer may further include a first ring-shaped protrusion disposed on an upper surface of a central part of the disk spacer to fit into the clamping part.

The disk spacer may further include a second ring-shaped protrusion disposed on an inner position of the second pressing part to fit into a central hole of the second disk.

The disk spacer may further include a central groove disposed at a lower surface of a central part of the disk spacer to accommodate a ring-shaped protrusion of the rotator.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 1 and 2 are cross-sectional diagrams illustrating conventional HDDs having 1.8-inch diameter disks, wherein FIG. 1 illustrates an HDD having two disks, and FIG. 2 illustrates an HDD having only one disk;

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
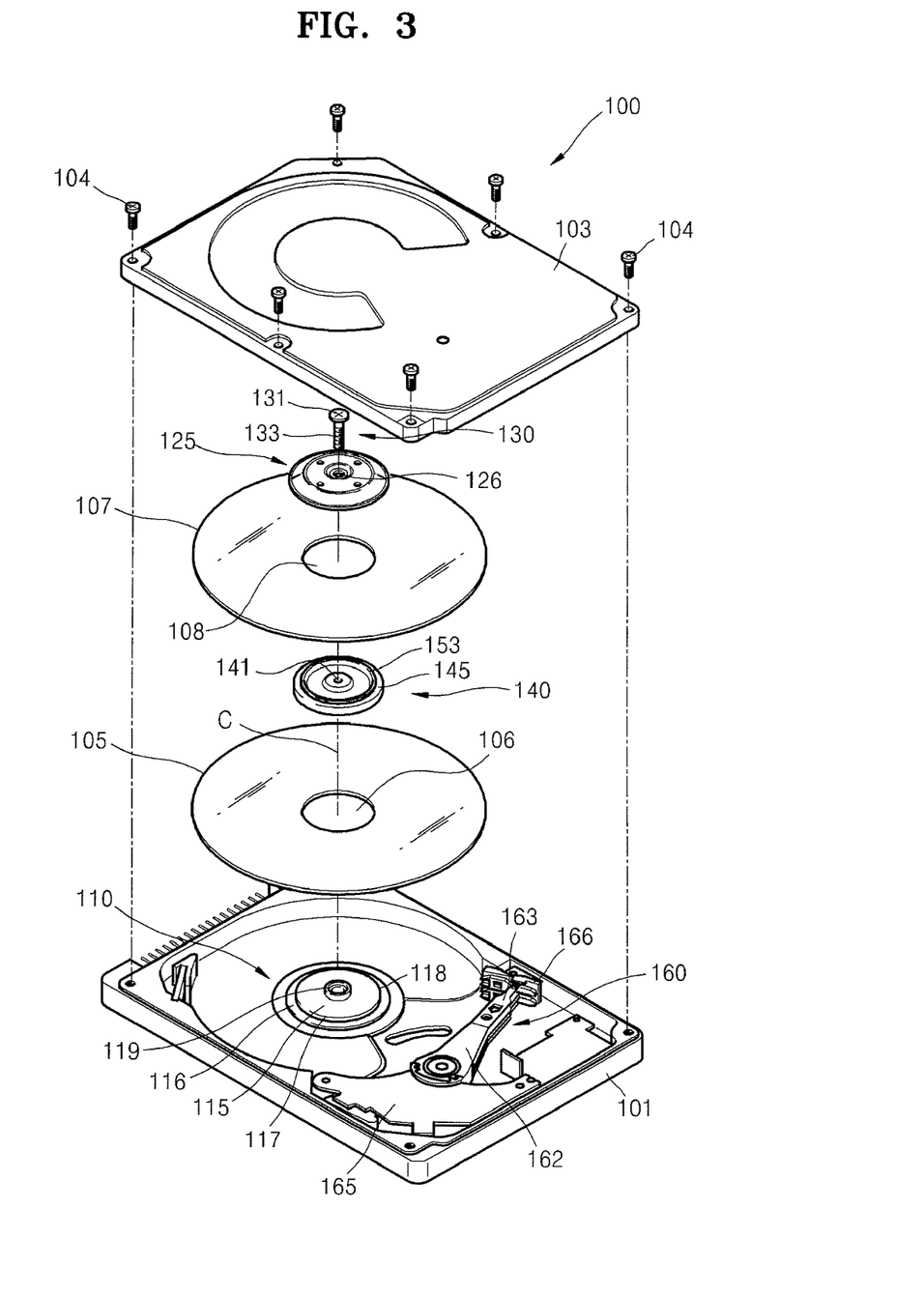
FIG. 3 is an exploded perspective view illustrating an HDD according to an embodiment of the present general inventive concept.
Figure 4:
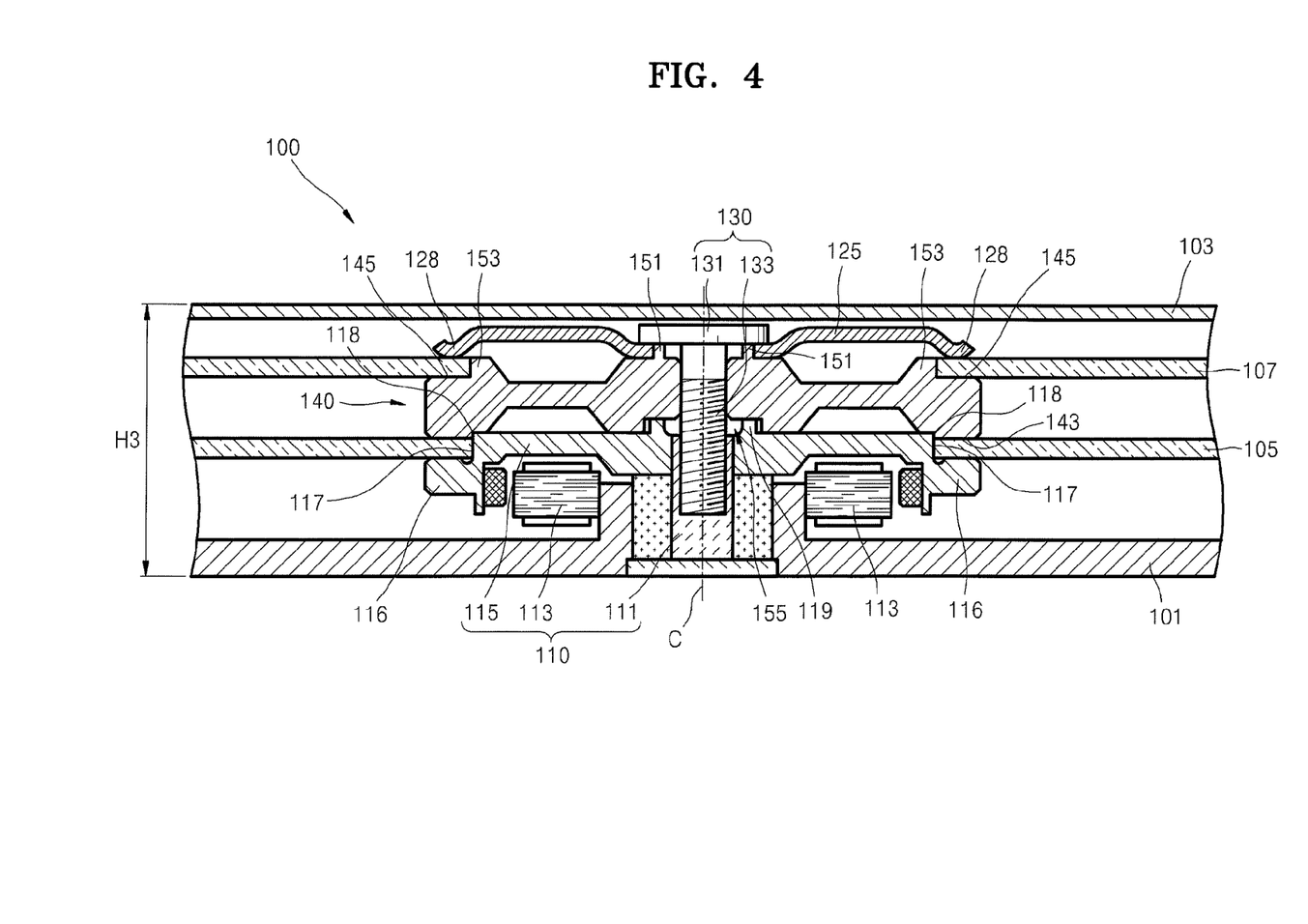
FIG. 4 is a cross-sectional diagram illustrating the HDD of FIG. 3.
Figure 5:
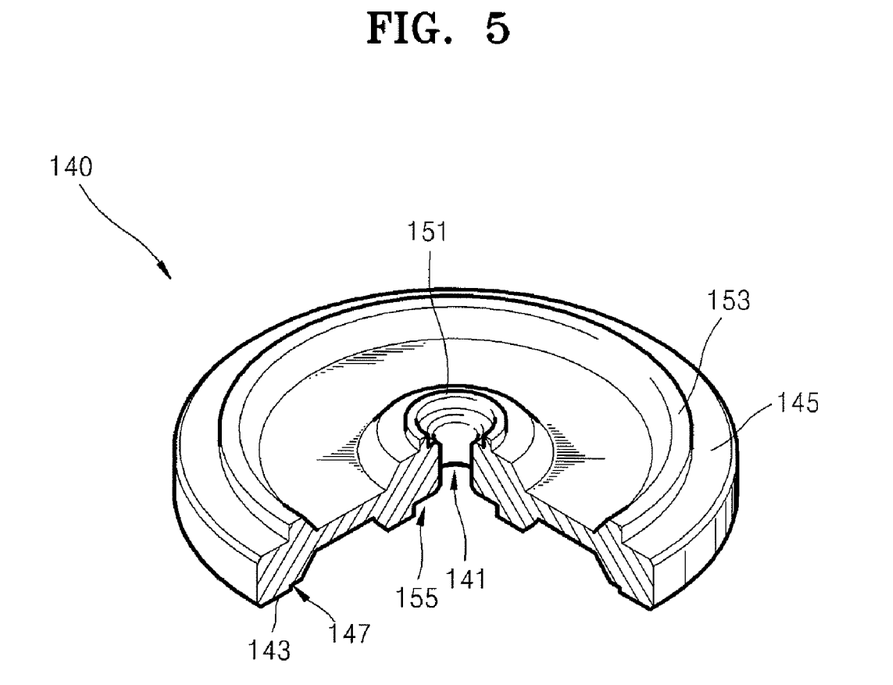
FIG. 5 is a cutaway perspective view illustrating a disk spacer illustrated in FIGS. 3 and 4, according to an embodiment of the present general inventive concept.

FIG. 3 is an exploded perspective view illustrating an HDD according to an embodiment of the present general inventive concept, FIG. 4 is a cross-sectional diagram illustrating the HDD of FIG. 3, and FIG. 5 is a cutaway perspective view illustrating a disk spacer 140 illustrated in FIGS. 3 and 4.

Referring to FIG. 3, the HDD 100 may include a base member 101, a cover member 103, first and second disks 105 and 107 that are used as data recording mediums, a spindle motor 110 to rotate the first and second disks 105 and 107, and an actuator 160. The cover member 103 can be assembled with the base member 101 using a plurality of fastening screws 104. The cover member 103 protects the spindle motor 110, the pair of disks 105 and 107, and the actuator 160, excludes dust and moisture from the HDD 100, and contains therein noise generated by the HDD 100.

The actuator 160 moves a magnetic head (not illustrated) to write and/or read data on and from tracks of the disk 105 or 107, and may include a swing arm 162, a suspension 163, and a voice coil motor (VCM) 165. The swing arm 162 is rotatably assembled with the base member 101. The suspension 163 is assembled with an edge part of the swing arm 162, and a head slider (not illustrated) is attached to an edge part of the suspension 163. The magnetic head is embedded in the head slider. The suspension 163 supports the head slider and elastically biases it towards the surface of the disk 105 or 107. When the disks 105 and 107 are rotated at a high speed by the spindle motor 110, lift is applied to the head slider away from the surface of the disk 105 or 107. The head slider floats above the disk 105 or 107 at a height which balances the lift and the elastic force of the suspension 163, and the magnetic head writes or reads data on or from the disk 105 or 107 while floating.

The VCM 165 provides a driving force to rotate the swing arm 162 and is controlled by a servo control system (not illustrated). The movement direction of the VCM 165 is determined by Fleming's left-hand law, based on an interaction between a current input to a voice coil (not illustrated) and a magnetic field formed by magnets (not illustrated). If the disks 105 and 107 are rotated at a high speed after the HDD 100 is turned on, the VCM 165 rotates the swing arm 162 counter-clockwise so that the head slider moves from a ramp 166 outside of the circumference of the disks 105 and 107 onto the disk 105 or 107. If the rotation of the disks 105 and 107 stops after the HDD 100 is turned off, the VCM rotates the swing arm 162 clockwise so that the head slider is parked back onto the ramp 166.

Referring to FIGS. 3 and 4, the spindle motor 110 includes a shaft 111, on which are mounted a stator 113 and a rotator 115. The rotator 115 may also be called a hub. The rotator 115 includes a cylindrical circumference part 117 and a flange 116 projecting outwards from below the cylindrical circumference part 117. The first disk 105 is located below the second disk 107 and mounted directly on the rotator 115. The cylindrical circumference part 117 of the rotator 115 passes through a central hole 106 of the first disk 105, and surroundings of the central hole 106 are supported by the flange 116. Since the spindle motor 110 is designed to hold only one disk, the cylindrical circumference part 117, the shaft 111, and the stator 113 are shorter than those of a spindle motor (referring to 20 of FIG. 1) designed to hold two disks.

The disk spacer 140 is mounted on the rotator 115, and supports the second disk 107. In order to fix the first and second disks 105 and 107 to the rotator 115, a disk clamp 125 can be pressed by a clamping screw 130 onto the disk spacer 140 and the second disk 107.

A body 133 of the clamping screw 130 may have an external thread. The body 133 passes through a screw hole 126 formed in the center of the disk clamp 125 and is screwed into the shaft 111. A head 131 of the clamping screw 130 presses the disk clamp 125 downwards so that an outer circumference part 128 of the disk clamp 125 presses surroundings of a central hole 108 of the second disk 107 downwards. The pressure of the disk clamp 125 fixes the first and second disks 105 and 107 and the disk spacer 140, which are located between the disk clamp 125 and the rotator 115, to the rotator 115.

Referring to FIGS. 3 and 5, the center of the disk spacer 140 may include a screw hole 141 through which the body 133 of the clamping screw 130 passes. Although it is not illustrated, an internal screw thread may be formed in the inner surface of the screw hole 141 to match the external screw thread of the body 133 of the clamping screw 130. The disk spacer 140 also may include a first disk pressing part 143, which presses the surroundings of the central hole 106 of the first disk 105, located in the lower surface of an outer circumference part thereof, and a second disk supporter 145, which faces and supports the surroundings of the central hole 108 of the second disk 107, located in the upper surface of the outer circumference part thereof.

A height of the cylindrical circumference part 117 of the rotator 115 is slightly greater than the thickness of the first disk 105. Thus, when the first disk 105 is mounted on the rotator 115, an outer circumference edge 118 of the rotator 115 projects slightly above the first disk 105. The disk spacer 140 also includes a step 147 (see FIG. 5) to match the outer circumference edge 118, in an inner position of the first disk pressing part 143 on the lower surface of the disk spacer 140.

A ring-shaped protrusion 119 can be formed in a central part of the rotator 115. When only one disk is mounted on the spindle motor 110, the ring-shaped protrusion 119 fits into the screw hole 126 of the disk clamp 125 mounted on the rotator 115. The disk spacer 140 also includes a central groove 155 which can accommodate the ring-shaped protrusion 119 of the rotator 115, in the lower surface of the central part thereof.

When the disk spacer 140 is mounted on the rotator 115, the step 147 and the central groove 155 of the disk spacer 140 help align the disk spacer 140 with a rotational axis C of the spindle motor 110.

The disk spacer 140 also may include a first ring-shaped protrusion 151, which fits into the screw hole 126 of the disk clamp 125, in the upper surface of the central part thereof. When the disk clamp 125 is mounted on the disk spacer 140, the first ring-shaped protrusion 151 helps align the disk clamp 125 with the rotational axis C of the spindle motor 110.

The disk spacer 140 also may include a second ring-shaped protrusion 153, which fits into the central hole 108 of the second disk 107, in an inner position of the second disk supporter 145 in the upper surface thereof. When the second disk 107 is mounted on the second disk supporter 145 of the disk spacer 140, the second ring-shaped protrusion 153 helps align the second disk 107 with the rotational axis C of the spindle motor 110.

The disk spacer 140 is functionally distinguished from the conventional spacer (referring to 19 of FIG. 1) in that the disk spacer 140 separates the first disk 105 and the second disk 107 from each other and aligns the second disk 107 with the rotational axis C. The disk spacer 140 must have sufficient stiffness to withstand a great pressure from the clamping screw 130. In addition, the disk spacer 140 may be made of a light material to allow a miniaturized HDD to be lightweight. Thus, titanium, stainless steel, or engineering plastics can be used to form the disk spacer 140.

If the diameter of the disks 105 and 107 included in the HDD 100 is 1.8 inches, the height H3 of the HDD 100 can be the same as the height H1 of the conventional HDD 10 having two disks, which is illustrated in FIG. 1.

As described above, according to the present general inventive concept, a disk spacer allows an additional disk to be mounted on a spindle motor, as well as any designed number of disks. For example, the disk spacer allows two disks to be mounted on a spindle motor designed to hold only one disk. Thus, a separate spindle motor for holding two disks does not have to be designed or manufactured, and a common spindle motor can be used regardless of the number of disks, thereby reducing the manufacturing cost of HDDs.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A disk spacer adjacent a clamping screw and located on a rotator of a spindle motor to allow an additional disk to be mounted on the spindle motor, the disk spacer comprising:
    a screw hole formed in a central part of the disk spacer to allow the clamping screw to pass through the disk spacer, the central part of the disk spacer being disposed against the clamping screw between a head of the clamping screw and an upper surface of the rotator and pressed by the head of the clamping screw;
    a first disk pressing part located at a lower surface of an outer circumference part of the disk spacer to press surroundings of a central hole of a first disk directly mounted on the rotator; and
    a second disk supporter located at an upper surface of the outer circumference part of the disk spacer to support the surroundings of a central hole of a second disk located above the first disk.

2. The disk spacer of claim 1, further comprising:
    a step portion to match an outer circumference edge of the rotator of the spindle motor disposed at an inner position of the first disk pressing part.

3. The disk spacer of claim 1, further comprising:
    a first ring-shaped protrusion to fit into a screw hole formed in a central part of a disk clamp disposed at an upper surface of the central part of the disk spacer.

4. The disk spacer of claim 1, further comprising:
    a second ring-shaped protrusion to fit into the central hole of the second disk disposed at an inner position of the second disk supporter.

5. The disk spacer of claim 1, further comprising:
a central groove, which can accommodate a ring-shaped protrusion formed in a central part of the rotator of the spindle motor, disposed at a lower surface of the central part of the disk spacer.

6. The disk spacer of claim 1, wherein an internal screw thread is formed in an inner surface of the screw hole of the disk spacer to match an external screw thread of the clamping screw.

7. The disk spacer of claim 1, wherein a material of the disk spacer comprises one of titanium, stainless steel, and engineering plastic.

8. A hard disk drive (HDD) comprising:
a shaft;
a spindle motor having a rotator rotatably assembled with the shaft;
a first disk directly mounted on the rotator;
a disk spacer located on the rotator;
a second disk supported by the disk spacer;
a disk clamp to fix the first and second disks to the rotator; and
a clamping screw screwed into the shaft to press the disk clamp and the disk spacer to fix the first and second disks to the rotator, the clamping screw having a head and a body,
wherein the disk spacer comprises:
a screw hole formed in a central part of the disk spacer to allow the clamping screw to pass through the disk spacer, the central part of the disk spacer disposed against the clamping screw between the head of the clamping screw and an upper surface of the rotator and pressed by the head of the clamping screw;
a first disk pressing part located at a lower surface of an outer circumference part of the disk spacer to press surroundings of a central hole of a first disk directly mounted on the rotator; and
a second disk supporter located at an upper surface of the outer circumference part of the disk spacer to support the surroundings of a central hole of a second disk located above the first disk.

9. The HDD of claim 8, wherein the disk spacer further comprises:
a step portion to match an outer circumference edge of the rotator of the spindle motor disposed at an inner position of the first disk pressing part.

10. The HDD of claim 8, wherein the disk spacer further comprises:
a first ring-shaped protrusion to fit into a screw hole formed in a central part of a disk clamp disposed at an upper surface of the central part of the disk spacer.

11. The HDD of claim 8, wherein the disk spacer further comprises:
a second ring-shaped protrusion to fit into the central hole of the second disk disposed at an inner position of the second disk supporter.

12. The HDD of claim 8, wherein the disk spacer further comprises:
a central groove which can accommodate a ring-shaped protrusion formed in a central part of the rotator of the spindle motor disposed at a lower surface of the central part of the disk spacer.

13. The HDD of claim 8, wherein an internal screw thread is formed in an inner surface of the screw hole of the disk spacer to match an external screw thread of the clamping screw.

14. The HDD of claim 8, wherein a material of the disk spacer comprises one of titanium, stainless steel, and engineering plastic.

15. A hard disk drive (HDD), comprising:
a shaft;
a spindle motor having a rotator to rotate with the shaft;
a first disk mounted at an upper and outer portion of the rotator;
a disk spacer disposed along a circumferential length of the rotator and above the first disk;
a second disk mounted at an upper and outer portion of the disk spacer; and
a clamp member to clamp the second disk to the disk spacer such that the disk spacer presses and contains the first disk at the outer portion of the rotator,
wherein the disk spacer includes a first ring-shaped protrusion to fit into a screw hole of the clamp member and to help align the disk clamp with a rotational axis of the spindle motor.

16. The HDD of claim 15, wherein the disk spacer comprises:
a first disk pressing part disposed at a lower surface of the outer portion of the disk spacer to press surroundings of a central hole of the first disk mounted on the rotator; and
a second disk supporter located at the upper and outer portion of the disk spacer to support surroundings of a central hole of the second disk.

17. The HDD of claim 16, wherein a height of the upper and outer portion of the rotator where the first disk is mounted is slightly higher that a thickness of the first disk, and the disk spacer further comprises a step portion to match the upper and outer portion of the rotator where the first disk is mounted at an inner portion of first pressing part.

18. A spindle motor assembly usable in a hard disk drive, the spindle motor assembly comprising:
a shaft;
a rotator rotatably mounted on the shaft to rotate and to support a first disk;
a stator disposed on the shaft; and
a disk spacer disposed on the rotator to support a second disk and to rotate with the rotator; and
a disk clamp having an inner circumference part and an outer circumference part disposed on the disk spacer, the inner circumference part being in contact with the disk spacer,
wherein the rotator accommodates only the first disk and the disk spacer allows the second disk to be installed on the rotator and the outer circumference part disk clamp contacts and presses the second disk.

19. The spindle motor assembly of claim 18, wherein the disk spacer comprises:
a main body;
a first pressing part disposed at a lower surface of an outer circumference of the main body to press a central portion of the first disk to the rotator;
a second pressing part disposed at an upper surface of the outer circumference of the main body to support a central portion of the second disk; and
a receiver to receive a screw to press the disk clamp so that the outer circumference part of the disk clamp presses the second disk to the disk spacer and the first disk to the rotator.

20. The spindle motor assembly of claim 19, wherein:
the first disk is mounted on an outer circumferential receiving part of the rotator and a height of the outer circumferential receiving part is slightly higher that a thickness of the first disk, and the disk spacer further comprises a step portion to match the outer circumferential receiving part at an inner portion of first pressing part.

21. A disk spacer usable with a single disk spindle assembly, the disk spacer comprising:

a main body;

a first pressing part disposed at a lower surface of an outer circumference of the in body to press a central portion of a first disk to a rotator of the spindle assembly;

a second pressing part disposed at an upper surface of the outer circumference of the main body to support a central portion of an additional disk;

a receiver to receive a screw of a clamping part to press the additional disk to the disk spacer and the first disk to the rotator, and a first ring-shaped protrusion on an upper surface of a central part of the disk spacer to fit into the clamping part.

22. The disk spacer of claim 21, further comprising:

a second ring-shaped protrusion disposed on an inner position of the second pressing part to fit into a central hole of the second disk.

23. The disk spacer of claim 21, further comprising:

a central groove disposed at a lower surface of a central part of the disk spacer to accommodate a ring-shaped protrusion of the rotator.

* * * * *